United States Patent Office.

J. B. NEWBROUGH AND E. FAGAN, OF NEW YORK, N. Y.

Letters Patent No. 69,470, dated October 1, 1867.

---

IMPROVED COMPOSITION FOR IMITATION RUBBER.

---

The Schedule referred to in these Letters Patent and making part of the same.

---

TO ALL WHOM IT MAY CONCERN:

Be it known that we, J. B. NEWBROUGH and E. FAGAN, of the city, county, and State of New York, have invented an improved Composition; and we do hereby declare the following to be a full, clear, and exact description of the same.

This invention consists in the combination of stearine or margarine with one or more materials described hereafter, whereby a substance or compound possessing many of the properties of vulcanized rubber is produced.

In order to enable others skilled in the art to prepare and apply this invention, we will now proceed to describe the manner of making and using the same.

When a substance is required which will resist the action of acids or alkalies, and which will be suitable as a base for artificial teeth and for other like purposes, sulphur is melted, and while at a low temperature is mixed with about one-half its weight of stearine or margarine, the two are then maintained at a low temperature, and are constantly stirred until thoroughly combined. The compound is then allowed to cool and harden, after which it may be remelted and cast or moulded into any required form. Should a substance of a more elastic nature be required, and one which it is not necessary should resist the action of acids or alkalies, gum-copal, mastic, or other similar gum may be substituted for the sulphur, or may be added to the same, and asbestos, plaster of Paris, earthy or other matters may be added as "bodies" to the composition.

We have found that a compound in which stearine or margarine is used as above described is tough, somewhat elastic, hard, durable, but little acted on by acids or alkalies, and may be colored by admixture with suitable materials, and, in fact, may be employed as a substitute for vulcanized rubber, which it closely resembles in nearly all its properties.

Without confining ourselves to any special proportions of the substances employed in the mixture, we claim as our invention, and desire to secure by Letters Patent—

As a new composition, stearine or margarine, and sulphur, gum-copal, or other suitable material, so combined and in such proportions as to form a compound of the nature herein described.

In testimony whereof we have hereunto set our hands to this specification in the presence of two subscribing witnesses.

J. B. NEWBROUGH,
E. FAGAN.

Witnesses:
    C. P. HART,
    C. A. MONTAGUE.